United States Patent
Cassidy et al.

(10) Patent No.: US 12,066,080 B2
(45) Date of Patent: Aug. 20, 2024

(54) BALL NUT ASSEMBLY

(71) Applicant: ZF Active Safety US Inc., Livonia, MI (US)

(72) Inventors: John Cassidy, Brighton, MI (US); Changming Wu, Plymouth, MI (US); Rich Dziklinski, Novi, MI (US)

(73) Assignee: ZF Active Safety US Inc., Livonia, MI (US)

( * ) Notice: Subject to any disclaimer, the term of this patent is extended or adjusted under 35 U.S.C. 154(b) by 1010 days.

(21) Appl. No.: 16/958,776

(22) PCT Filed: Dec. 28, 2018

(86) PCT No.: PCT/US2018/067935
§ 371 (c)(1),
(2) Date: Jun. 29, 2020

(87) PCT Pub. No.: WO2019/133855
PCT Pub. Date: Jul. 4, 2019

(65) Prior Publication Data
US 2020/0324805 A1   Oct. 15, 2020

Related U.S. Application Data

(60) Provisional application No. 62/611,905, filed on Dec. 29, 2017.

(51) Int. Cl.
*F16H 25/20* (2006.01)
*F16H 25/22* (2006.01)
(Continued)

(52) U.S. Cl.
CPC ......... *F16H 25/2223* (2013.01); *F16D 65/28* (2013.01); *F16D 2125/36* (2013.01); *F16D 2125/40* (2013.01)

(58) Field of Classification Search
CPC .. F16H 25/2223; F16H 25/2228; F16H 25/24; F16D 65/28; F16D 2125/36; F16D 2125/40
See application file for complete search history.

(56) References Cited

U.S. PATENT DOCUMENTS 2,924,113 A * 2/1960 Na ...................... F16H 25/2209
74/424.86
6,227,064 B1   5/2001 Nakamura
(Continued)

FOREIGN PATENT DOCUMENTS

DE   102011122532 A1 *  6/2013 ......... F16H 25/2223
DE   102015209643 B3 * 11/2016 ......... F16H 25/2219

*Primary Examiner* — Zakaria Elahmadi
(74) *Attorney, Agent, or Firm* — Kristin L. Murphy

(57) ABSTRACT

A ball nut assembly comprises a spindle having a longitudinal axis, a ball nut, and bearing elements supporting the ball nut on the spindle. First, second, third, and fourth ball nut deflectors are between the ball nut and the spindle. First, second, and third planes extend parallel to the axis. The first and fourth ball nut deflectors are in the first plane, the second ball nut deflector is in the second plane, the third ball nut deflector is in the third plane. Furthermore, the second and third ball nut deflectors are on opposite sides of the first plane. A first acute angle is between the first and second planes and a second acute angle is between the first and third planes.

20 Claims, 5 Drawing Sheets

(51) Int. Cl.
  *F16D 65/28*   (2006.01)
  *F16D 125/36*  (2012.01)
  *F16D 125/40*  (2012.01)

(56) References Cited

U.S. PATENT DOCUMENTS

| | | | |
|---|---|---|---|
| 6,397,697 B1* | 6/2002 | Ninomiya | F16H 25/2223 74/424.86 |
| 2002/0003059 A1 | 1/2002 | Yoshioka et al. | |
| 2003/0066372 A1* | 4/2003 | Kobayashi | F16H 25/2223 74/424.82 |
| 2005/0076733 A1* | 4/2005 | Yamamoto | B62D 5/0448 74/424.87 |
| 2006/0207361 A1 | 9/2006 | Kazuno | |
| 2017/0299028 A1 | 10/2017 | Kreutzer et al. | |

* cited by examiner

BALL NUT ASSEMBLY

CROSS REFERENCE TO RELATED APPLICATION

This application is a national stage of International Application No. PCT/US18/067935, filed Dec. 28, 2018, the disclosure of which is incorporated herein by reference in its entirety, and which claimed priority to U.S. Provisional Patent Application No. 62/611,905, filed Dec. 29, 2017, the disclosure of which is incorporated herein by reference in its entirety.

BACKGROUND OF THE INVENTION

This invention relates in general to ball nut assemblies and in particular to an improved structure for a ball nut assembly that may be used, e.g., in a vehicle brake system.

An automotive vehicle typically includes a vehicle brake system for slowing and stopping the vehicle. The vehicle brake system typically includes a brake pedal operated by a driver of the vehicle, a master cylinder that generates brake pressure when the brake pedal is depressed by the driver, and fluid conduits arranged in brake circuits that carry the brake pressure to wheel brakes. The vehicle brake system may also include an integrated brake control (IBC) system having a plunger assembly to generate a secondary source of brake pressure, independent from the master cylinder. The plunger assembly has a ball nut assembly that converts rotational motion of a spindle to linear motion of a ball nut that moves a piston. Bearing elements—e.g., ball bearings—support the ball nut on the spindle. The ball nut assembly also includes at least one recirculation track formed between threads of the spindle and ball nut for the bearing elements. A return portion for each of the recirculation tracks may be a ball nut deflector.

The ball nut being supported by the bearing elements on the spindle imposes bearing forces on the bearing elements. However, the bearing elements do not support the ball nut on the spindle when the bearing elements pass through the ball nut deflector. As such, the bearing forces are not imposed on the bearing elements when the bearing elements pass through the ball nut deflector. The bearing forces not being imposed on the bearing elements passing through the ball nut deflector means the bearing forces are unbalanced around the ball nut. The unbalanced bearing forces result in an unbalanced bending moment acting on the ball nut assembly. The unbalanced bending moment results in undesirable noise, vibration, and harshness on the ball nut assembly. The unbalanced moment also results in wear on the ball nut assembly. Furthermore, a size of the plunger assembly is constrained by packaging considerations for the vehicle. Thus, it would be desirable to have a ball nut assembly that optimizes balancing the bending moments acting on the ball nut assembly and minimizes needed packaging space.

Examples of prior art ball nut assemblies are disclosed in U.S. Pat. Nos. 2,924,113, 6,082,209, and 6,397,697.

SUMMARY OF THE INVENTION

This invention relates to an improved ball nut assembly. In particular this invention relates to an improved ball nut assembly for use, e.g., in a vehicle brake system and related components thereof.

According to one embodiment, a ball nut assembly for a vehicle brake system may comprise, individually and/or in combination, one or more of the following features: a spindle having a longitudinal axis, a ball nut, bearing elements supporting the ball nut on the spindle, first, second, third, and fourth ball nut deflectors between the ball nut and the spindle, and first, second, and third planes extending parallel to the axis. The first and fourth ball nut deflectors are in the first plane, the second ball nut deflector is in the second plane, and the third ball nut deflector is in the third plane. The second and third ball nut deflectors are on opposite sides of the first plane. A first acute angle is defined by the first and second planes and a second acute angle is defined by the first and third planes.

According to this embodiment, the first, second, and third planes intersect along the axis.

According to this embodiment, the first and second acute angles are equal.

According to this embodiment, a first recirculation track corresponds to the first ball nut deflector, a second recirculation track corresponds to the second ball nut deflector, a third recirculation track corresponds to the third ball nut deflector, and a fourth recirculation track corresponds to the fourth ball nut deflector. The second and third recirculation tracks are mutually adjoining.

According to this embodiment, the first and third recirculation tracks are not mutually adjoining.

According to this embodiment, the second and third ball nut deflectors are both between the first and fourth ball nut deflectors along the axis.

According to this embodiment, a first distance is between furthest extents of the first and third ball nut deflectors, a second distance is between furthest extents of the second and fourth ball nut deflectors, and a third distance is between the furthest extents of the first and fourth ball nut deflectors. The second ball nut deflector is between the first and third ball nut deflectors, the third ball nut deflector is between the second and fourth ball nut deflectors, the first, second, and third distances are parallel to the axis, and a sum of the first and second distances is greater than the third distance.

According to this embodiment, a first recirculation track corresponds to the first ball nut deflector, a second recirculation track corresponds to the second ball nut deflector, a third recirculation track corresponds to the third ball nut deflector, and a fourth recirculation track corresponds to the fourth ball nut deflector. The second and third recirculation tracks overlap parallel to the axis for an overlap distance.

According to this embodiment, at least one ramp portion is between at least one of the first, second, third, and fourth ball nut deflectors and an outer thread of the ball nut.

According to this embodiment, the ball nut assembly is adapted for use in a plunger assembly of the vehicle brake system.

According to another embodiment, a ball nut assembly may comprise, individually and/or in combination, one or more of the following features: a first ball nut deflector for a first recirculation track, a second ball nut deflector for a second recirculation track, a third ball nut deflector for a third recirculation track, a fourth ball nut deflector for a fourth recirculation track, and a longitudinal axis, a first plane extending parallel to the axis and in which the first and fourth ball nut deflectors are located, a second plane extending parallel to the axis and in which the second ball nut deflector is located, a third plane extending parallel to the axis and in which the third ball nut deflector is located, a first acute angle is defined by the first and second planes, and a second acute angle is defined by the first and third planes.

According to this embodiment, the first, second, and third planes intersect along the axis.

According to this embodiment, the first and second acute angles are equal.

According to this embodiment, the second and third recirculation tracks are mutually adjoining.

According to this embodiment, the first and third recirculation tracks are not mutually adjoining.

According to this embodiment, the second and third recirculation tracks overlap parallel to the axis for an overlap distance.

According to this embodiment, a spindle extends along the axis and a ball nut is supported on the spindle by bearing elements. The first, second, third, and fourth ball nut deflectors are supported between the spindle and the ball nut. At least one ramp portion is between at least one of the first, second, third, and fourth ball nut deflectors and an outer thread of the ball nut.

According to yet another embodiment, a ball nut assembly may comprise, individually and/or in combination, one or more of the following features: a spindle having a longitudinal axis, a ball nut, bearing elements supporting the ball nut on the spindle, a first ball nut deflector for a first recirculation track between the spindle and ball nut, a second ball nut deflector for a second recirculation track between the spindle and ball nut, a third ball nut deflector for a third recirculation track between the spindle and ball nut, and a fourth ball nut deflector for a fourth recirculation track between the spindle and ball nut. The second and third recirculation tracks are mutually adjoining, the first and third recirculation tracks are not mutually adjoining, and the second and third recirculation tracks overlap parallel to the axis for an overlap distance. First, second, and third planes extend parallel to the axis. The first and fourth ball nut deflectors are in the first plane, the second ball nut deflector is in the second plane, the third ball nut deflector is in the third plane, and the second and third ball nut deflectors are on opposite sides of the first plane. A first acute angle is defined by the first and second planes and a second acute angle is defined by the first and third planes.

According to this embodiment, the first and second acute angles are equal.

According to this embodiment, a ramp portion and smoothed transition is between each of the first, second, third, and fourth ball nut deflectors and an outer thread of the ball nut.

A potential advantage of an embodiment is a ball nut assembly having reduced noise, vibration and harshness. A further potential advantage of an embodiment is reduced wear and overall size. Other advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
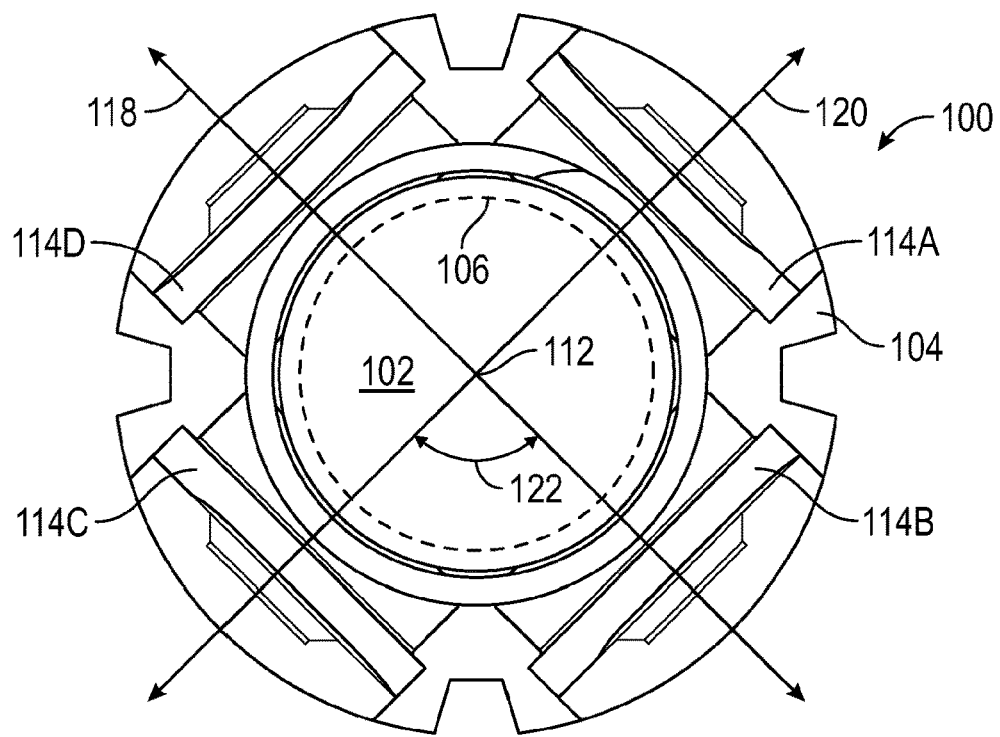
FIG. 1 is a first elevation view of a prior art ball nut assembly.
Figure 2:
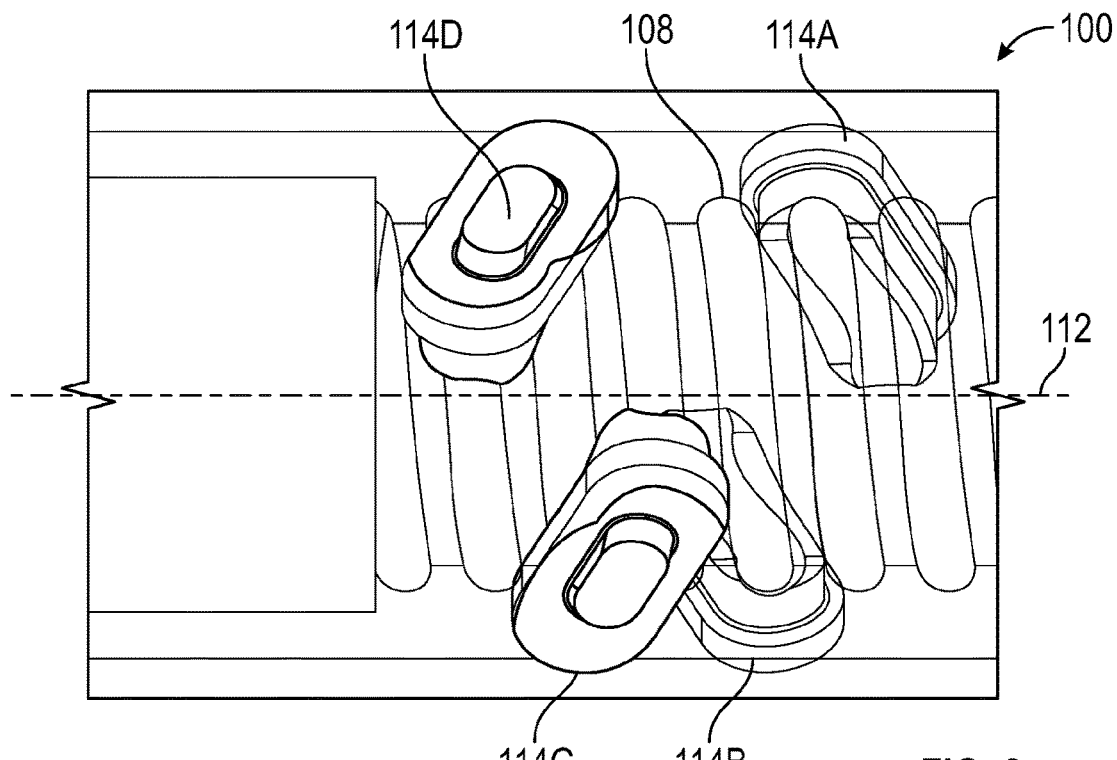
FIG. 2 is a second elevation view of the prior art ball nut assembly of FIG. 1.
Figure 3:
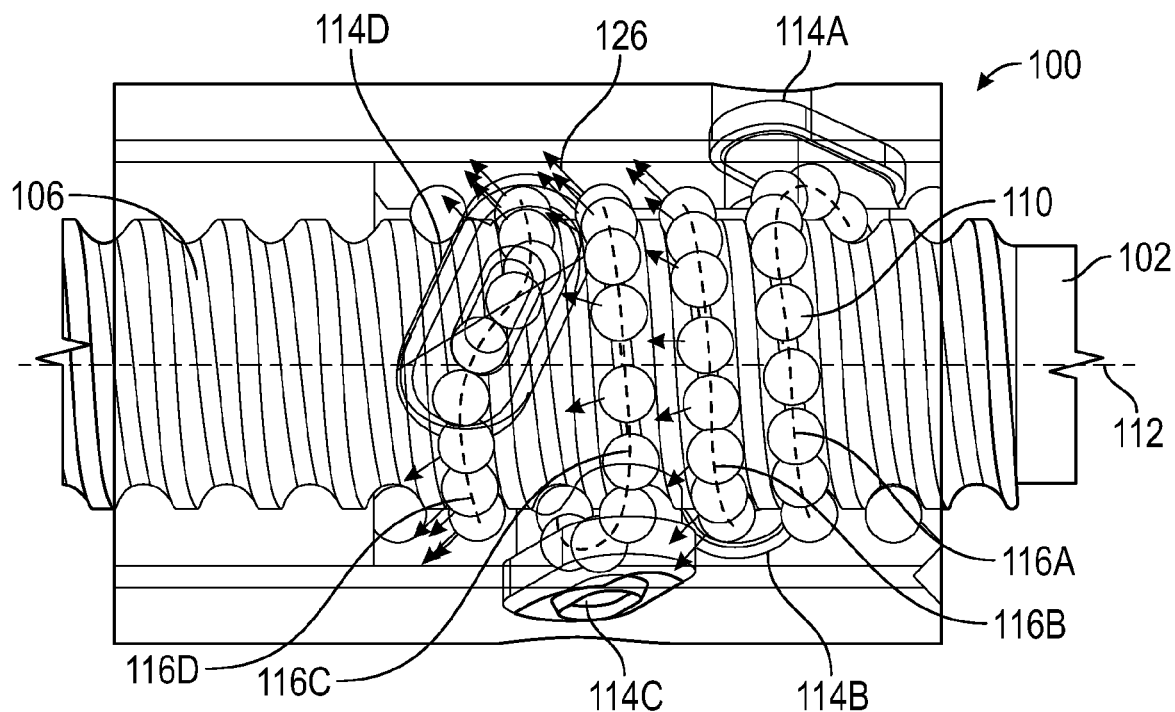
FIG. 3 is a third elevation view of the prior art ball nut assembly of FIG. 1.

Referring now to FIGS. 1-6, there is illustrated a prior art ball nut assembly, indicated generally at 100. The ball nut assembly 100 includes a spindle 102 and a ball nut 104. The ball nut 104 is mounted on the spindle 102. Inner threads 106 on the spindle 102 and corresponding outer threads 108 on the ball nut 104 form recirculation tracks for bearing elements 110. As a non-limiting example, the bearing elements 110 may be ball bearings. The spindle 102 or the ball nut 104 is held stationary while the other of the spindle 102 or the ball nut 104 is rotated. As a result, the spindle 102 or the ball nut 104 that is rotationally restrained moves linearly along a longitudinal axis 112.

Also provided for the ball nut assembly 100 are first, second, third, and fourth ball nut deflectors 114A, 114B, 114C, and 114D, respectively. The first, second, third, and fourth ball nut deflectors 114A, 114B, 114C, and 114D, respectively, complete recirculation tracks. Specifically, the first ball nut deflector 114A completes a first recirculation track 116A between the inner and outer threads 106 and 108, respectively. The second ball nut deflector 114B completes a second recirculation track 116B between the inner and outer threads 106 and 108, respectively. The third ball nut deflector 114C completes a third recirculation track 116C between the inner and outer threads 106 and 108, respectively. The fourth ball nut deflector 114D completes a fourth recirculation track 116D between the inner and outer threads 106 and 108, respectively. Paths of the bearing elements 110 in each of the first, second, third, and fourth recirculation tracks 116A, 116B, 116C, and 116D, respectively, are shown by dashed lines in FIG. 3. Each of the first, second, third, and fourth recirculation tracks 116A, 116B, 116C, and 116D, respectively, is separate from the others of the first, second, third, and fourth recirculation tracks 116A, 116B, 116C, and 116D, respectively. As such, the bearing elements 110 do not move between the first, second, third, and fourth recirculation tracks 116A, 116B, 116C, and 116D, respectively. As illustrated, the ball nut assembly 100 has the first, second, third, and fourth ball nut deflectors 114A, 114B, 114C, and 114D, respectively. Alternatively, the ball nut assembly 100 may have more or fewer than the first, second, third, and fourth ball nut deflectors 114A, 114B, 114C, and 114D, respectively.

The first and third ball nut deflectors 114A and 114C, respectively, are aligned in a first plane 118 extending parallel to the axis 112. The second and fourth ball nut deflectors 114B and 114D, respectively, are aligned in a second plane 120 also extending parallel to the axis 112. The first and second planes 118 and 120, respectively, intersect at the axis 112. The first and second planes 118 and 120, respectively, are offset at an angle 122. The angle 122 is 90° such that the first, second, third, and fourth ball nut deflectors 114A, 114B, 114C, and 114D, respectively, are evenly spaced around a circumference of the ball nut 104.

Figure 4:
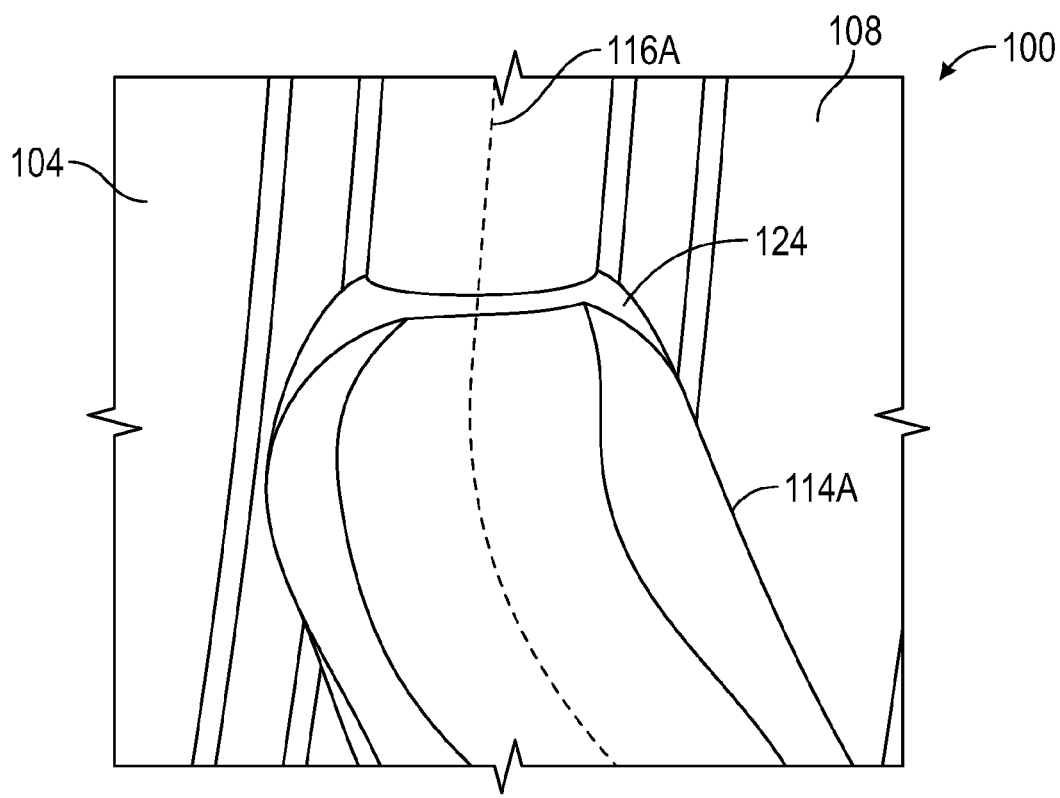
FIG. 4 is a perspective view of a portion of a prior art ball nut deflector for the prior art ball nut assembly of FIG. 1.

Referring now to FIG. 4, there is illustrated a portion of the first ball nut deflector 114A in detail. The second, third, and fourth ball nut deflectors 114B, 114C, and 114D, respectively, are similar to the first ball nut deflector 114A shown in FIG. 4. A step or ledge 124 is between the first recirculation track 116A on the outer threads 108 and the first ball nut deflector 114A. The bearing elements 110 (shown in FIG. 3) travelling in the first recirculation track 116A strike or otherwise contact the step 124 when entering or exiting between the first recirculation track 116A and the first ball nut deflector 114A.

Figure 5:
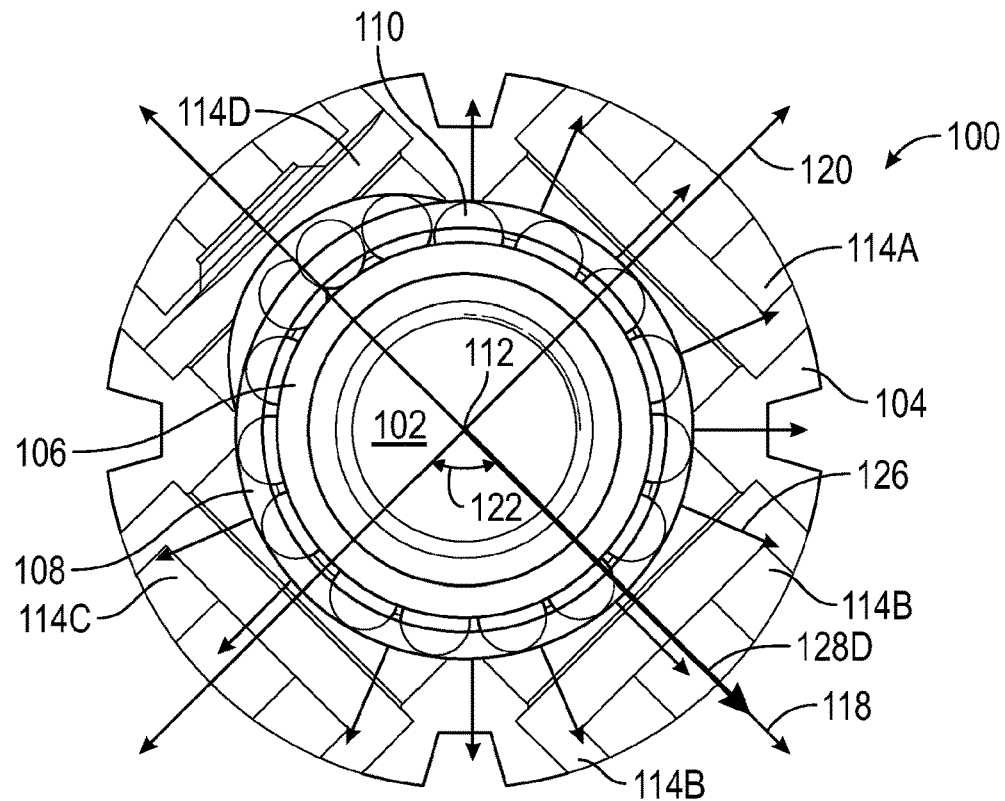
FIG. 5 is a fourth elevation view of the prior art ball nut assembly of FIG. 1 showing a net bearing force.

Referring now to FIG. 5, as discussed, the bearing elements 110 support the ball nut 104 on the spindle 102. This results in bearing forces 126 being imposed on the bearing elements 110. In FIG. 5, the bearing forces 126 are not imposed on the bearing elements 110 in the fourth ball nut deflector 114D because the ball nut 104 is not supported on the spindle 102 by the bearing elements 110 in the fourth ball nut deflector 114D. Similarly, the bearing forces 126 are not imposed on the bearing elements 110 in the first, second, and third ball nut deflectors 114A, 114B, and 114C, respectively.

In FIG. 5, the bearing forces 126 imposed on the bearing elements 110 in the fourth recirculation track 116D are illustrated. The bearing forces 126 imposed on the bearing elements 110 in the fourth recirculation track 116D are unbalanced and sum to a fourth net bearing force 128D. The bearing elements 110 in the first, second, and third recirculation tracks 116A, 116B, and 116C, respectively, each sum to similar net bearing forces. The fourth net bearing force 128D is directed radially away from the fourth ball nut deflector 114D. This is because there are no bearing forces imposed on the bearing elements 110 in the fourth ball nut deflector 114D.

Figure 6:
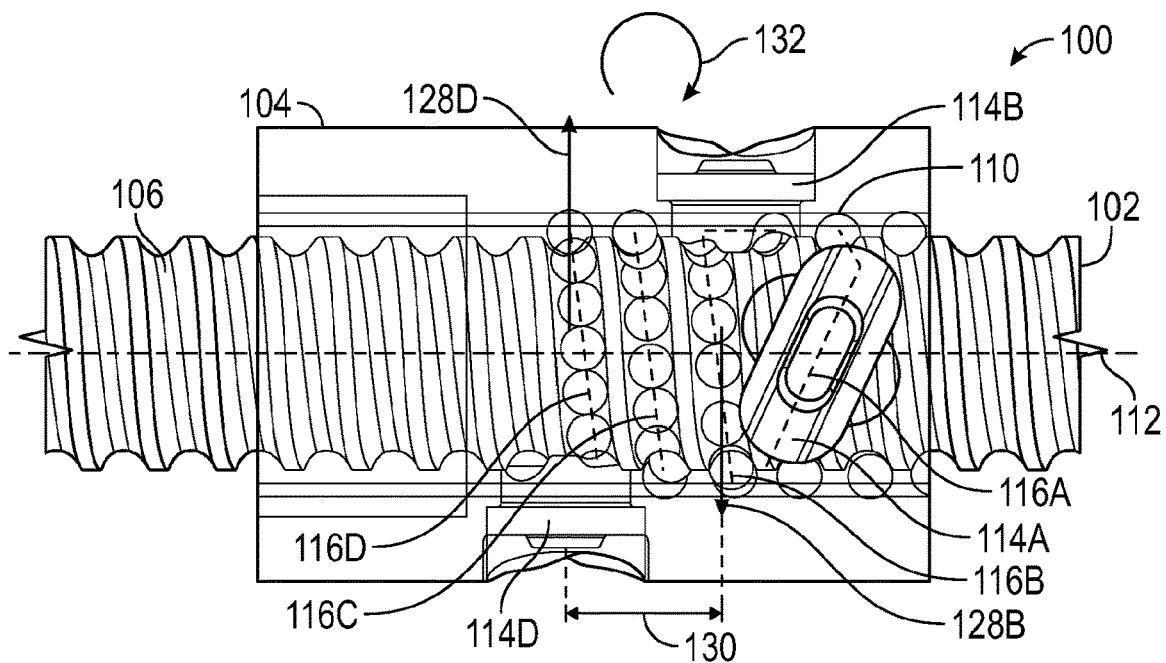
FIG. 6 is a fifth elevation view of the prior art ball nut assembly of FIG. 1 showing a bending moment.

Referring now to FIG. 6, there is illustrated a second net bearing force 128B for the second recirculation track 116B. As shown in FIG. 6, the second ball nut deflector 114B is positioned in the ball nut 104 opposite the fourth ball nut deflector 114D. As a result, the second and fourth net bearing forces 128B and 128D, respectively, are directed oppositely. The second and fourth net bearing forces 128B and 128D, respectively, being opposite each other combined with an offset 130 between the second and fourth ball nut deflectors 114B and 114D, respectively, produce a bending moment 132 on the ball nut assembly 100. A similar bending moment, perpendicular to the bending moment 132, is produced from net bearing forces on the first and third recirculation tracks and a second offset between the first and third ball nut deflectors 114A and 114C, respectively.

Figure 7:
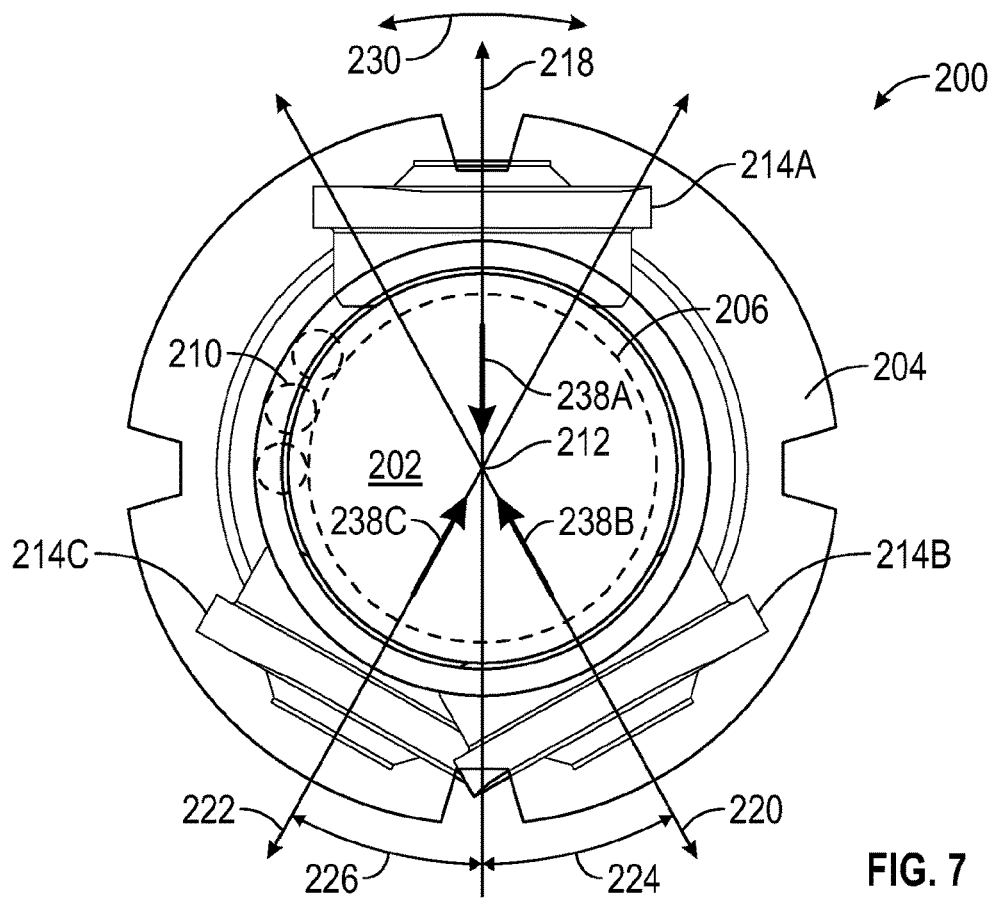
FIG. 7 is a first elevation view of a ball nut assembly in accordance with the present invention.
Figure 8:
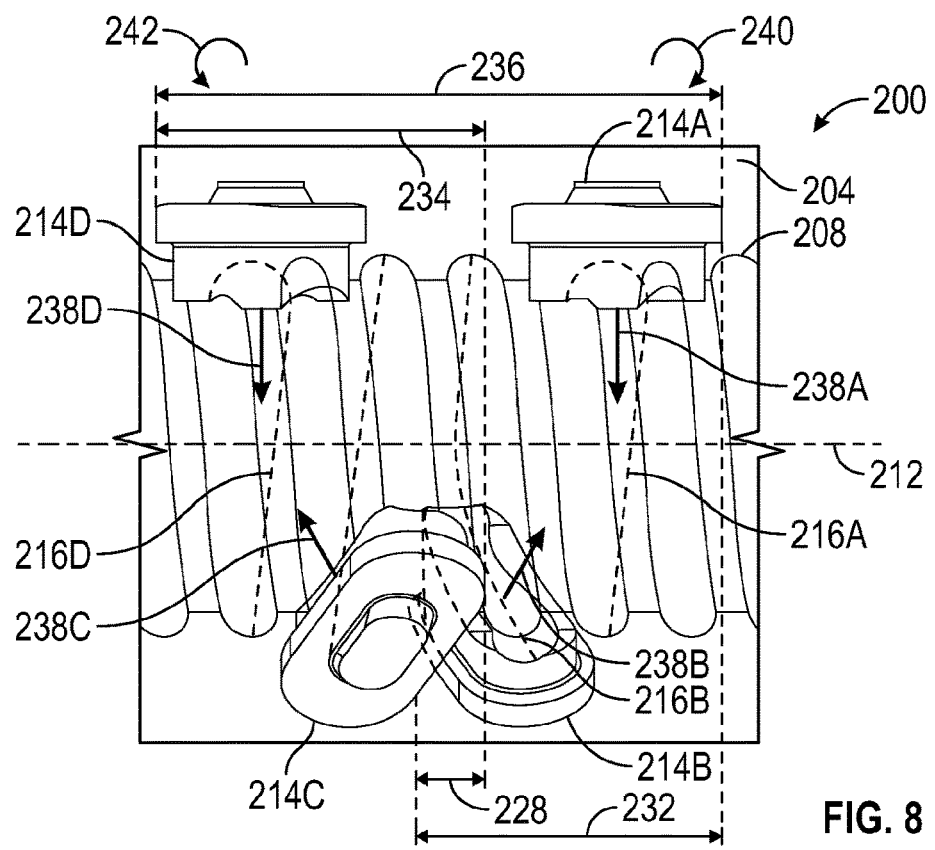
FIG. 8 is a second elevation view of the ball nut assembly of FIG. 7.

Referring now to FIGS. 7 and 8, there is illustrated a ball nut assembly, indicated generally at 200, in accordance with the present invention. The ball nut assembly 200 may be used for a vehicle brake system. Specifically, the ball nut assembly 200 may be used with a plunger assembly of the vehicle brake system. The vehicle brake system may be as disclosed by U.S. Pat. No. 9,321,444 to Ganzel, the disclosure of which is hereby incorporated by reference in entirety herein. The vehicle brake system disclosed by Ganzel includes a plunger assembly that the ball nut assembly 200 is adapted for use in. Alternatively, the vehicle brake system may be any suitable vehicle brake system.

The ball nut assembly 200 includes a spindle 202 and a ball nut 204. The ball nut 204 is mounted on the spindle 202. Inner threads 206 (shown by dashed lines in FIG. 7) on the spindle 202 and corresponding outer threads 208 on the ball nut 204 form recirculation tracks for bearing elements 210 (shown by dashed lines in FIG. 7). As a non-limiting example, the bearing elements 210 may be ball bearings. Either the spindle 202 or the ball nut 204 is held stationary while the other of the spindle 202 or the ball nut 204 is rotated. As a result, the spindle 202 or the ball nut 204 that is rotationally restrained moves linearly along a longitudinal axis 212. Further, it is within the scope of the invention that either the spindle 202 or the ball nut 204 can be used to drive a plunger assembly of the vehicle brake system.

Also provided for the ball nut assembly 200 are first, second, third, and fourth ball nut deflectors 214A, 214B, 214C, and 214D, respectively. The first, second, third, and fourth ball nut deflectors 214A, 214B, 214C, and 214D, respectively, are supported between the spindle 202 and the ball nut 204. Alternatively, the ball nut assembly 200 may have more or fewer than the first, second, third, and fourth ball nut deflectors 214A, 214B, 214C, and 214D, respectively, that are illustrated.

Each of the first, second, third, and fourth ball nut deflectors 214A, 214B, 214C, and 214D, respectively, corresponds to a recirculation track for the ball nut assembly 200. The first, second, third, and fourth ball nut deflectors 214A, 214B, 214C, and 214D, respectively, complete the recirculation tracks. Specifically, the first ball nut deflector 214A completes a first recirculation track 216A between the inner and outer threads 206 and 208, respectively. The second ball nut deflector 214B completes a second recirculation track 216B between the inner and outer threads 206 and 208, respectively. The third ball nut deflector 214C completes a third recirculation track 216C between the inner and outer threads 206 and 208, respectively. The fourth ball nut deflector 214D completes a fourth recirculation track 216D between the inner and outer threads 206 and 208, respectively. Paths of the bearing elements 210 in each of the first, second, third, and fourth recirculation tracks 216A, 216B, 216C, and 216D, respectively, are shown by dashed lines in FIG. 8. Each of the first, second, third, and fourth recirculation tracks 216A, 216B, 216C, and 216D, respectively, is separate from the others of the first, second, third, and fourth recirculation tracks 216A, 216B, 216C, and 216D, respectively. As such, the bearing elements 210 do not move between the first, second, third, and fourth recirculation tracks 216A, 216B, 216C, and 216D, respectively. In addition, while the illustrated embodiment shows each recirculation track encircling the spindle 202 once, it is within the scope of the invention that one or more recirculation tracks could encircle the spindle 202 more than once. Respectively, one or more of the ball nut deflectors may span two or more the inner and outer threads 206 and 208 to enable a respective recirculation track to encircle the spindle 202 more than once.

As shown in FIG. 8, the second recirculation track 216B is mutually adjoined with the first recirculation track 216A and the third recirculation track 216C. As also shown in FIG. 8, the third recirculation track 216C is mutually adjoined with the second recirculation track 216B and the fourth recirculation track 216D. Furthermore, the first recirculation track 216A is not mutually adjoined with the third or fourth recirculation track 216C or 216D, respectively, as the second recirculation track 216B is located in between the first recirculation track 216A and the third and fourth recirculation tracks 216C and 216D, respectively. Similarly, the fourth recirculation track 216D is not mutually adjoined with the first or second recirculation tracks 216A or 216B, respectively, as the third recirculation track 216C, is located in between the fourth recirculation track 216D and the first and second recirculation tracks 216A and 216B, respectively.

The first and fourth ball nut deflectors 214A and 214D, respectively, are aligned or otherwise located in a first plane 218 extending along or parallel to the axis 212. The second ball nut deflector 214B is aligned or otherwise located in a second plane 220 extending along or parallel to the axis 212.

The third ball nut deflector 214C is aligned or otherwise located in a third plane 222 extending along or parallel to the axis 212. The first, second, and third planes 218, 220, and 222, respectively, intersect at the axis 212. The first and second planes 218 and 220, respectively, are offset from each other by a first angle 224. The first and third planes 218 and 222, respectively, are offset from each other by a second angle 226. The first and second angles 224 and 226, respectively, are acute angles. The second and third planes 220 and 222, respectively, are not parallel with each other or with the first plane 218.

As shown in FIG. 7, the first and second angles 224 and 226, respectively, are equal. In FIG. 7, the first and second angles 224 and 226, respectively, are each 30°. Alternatively, the first and second angles 224 and 226, respectively, could be other than equal and/or 30°. As a non-limiting example, the first and second angles 224 and 226, respectively, may each independently be a value that approaches 0°.

The second ball nut deflector 214B being offset from the first plane 218 by the first angle 224 and the third ball nut deflector 214C being offset from the first plane 218 by the second angle 226 allows the second and third ball nut deflectors 214B and 214C, respectively, to overlap for an overlap distance 228 parallel to the axis 212. The overlap distance 228 is defined as the distance between the portion of the second ball nut deflector 214B that extends the farthest along the axis 212 towards the fourth ball nut deflector 214D and the portion of the third ball nut deflector 214C that extends the farthest along the axis 212 towards the first ball nut deflector 214A. The overlap distance 228 is an axial length parallel to, or otherwise along, the axis 212 for which the second and third ball nut deflectors 214B and 214C, respectively, are positioned next to each.

As the first and second angles 224 and 226, respectively, increase, the second and third ball nut deflectors 214B and 214C, respectively, move away from each other in a circumferential direction 230 (shown in FIG. 7). Also, as the first and second angles 224 and 226, respectively, increase, the overlap distance 228 may then be increased by moving the second and third ball nut deflectors 214B and 214C, respectively, towards each other along the axis 212. When the overlap distance 228 increases, an overall length of the ball nut assembly 200 along the axis 212 may be reduced.

Conversely, as the first 224 and second angles 226 approach 0°, the ball nut deflectors 214B and 214C begin to interfere with the space occupied by the other due to the decreasing distance between ball nut deflectors 214B and 214C. In order to allow a sufficient distance between the ball nut deflectors 214B and 214C, the thread pitch of the spindle 202 must be increased or unutilized recirculation grooves on the spindle 202 must be provided between the second 214B and third 214C ball nut deflectors. However, this results in an increased overall axial length of the ball nut 204 in the axial direction. Thus, increasing the first 224 and second angles 226 allows for a decreased distance between the ball nut deflectors 214B and 214C, reducing the overall length of the ball nut 204 in the axial direction. Therefore, the bending moment resultant values of the illustrated present invention are less than the bending moment resultant values of the design illustrated in FIG. 1 and FIG. 2, while providing a compact axial length of the ball nut 204.

It is further within the scope of the invention that mutually adjoined recirculation tracks may be positioned next to each other such that the inner threads 206 of the spindle 202 have little space unoccupied by the bearing elements 210 between mutually adjoined recirculation tracks. For example, if the first 214A and second 214B ball nut deflectors are rotated 150° relative to one another, bearing elements 210 of the first 216A and second 216B recirculation tracks would not occupy approximately 150° of the spindle 202 inner threads 206. However, it is also within the scope of the invention that mutually adjoined recirculation tracks may be positioned next to each other such that the inner threads 206 of the spindle 202 have additional space unoccupied by the bearing elements 210 between mutually adjoined recirculation tracks. For example, if the first 214A and second 214B ball nut deflectors are rotated 150° relative to one another with at least one additional thread between the mutually adjoined recirculation tracks, bearing elements 210 of the first 216A and second 216B recirculation tracks would not occupy 510° of the spindle 202 inner threads 206.

A first distance 232 is defined between furthest extents of the first and third ball nut deflectors 214A and 214C, respectively. A second distance 234 is defined between furthest extents of the second and fourth ball nut deflectors 214B and 214D, respectively. A third distance 236 is defined between the furthest extents of the first and fourth ball nut deflectors 214A and 214D, respectively. A sum of the first and second distances 232 and 234, respectively, is greater than the third distance 236. As the first and second angles 224 and 226, respectively, increase, the third distance 236 may be reduced while the first and second distances 232 and 234, respectively, remain unchanged. The overlap distance 228 may be defined as a difference between the third distance 236 and the sum of the first and the second distances 232 and 234, respectively.

The bearing elements 210 support the ball nut 204 on the spindle 202. This results in bearing forces being imposed on the bearing elements 210. The bearing forces are not imposed on the bearing elements 210 in the first, second, third, and fourth ball nut deflectors 214A, 214B, 214C, and 214D, respectively, because the ball nut 204 is not supported on the spindle 202 by the bearing elements 210 in the first, second, third, and fourth ball nut deflectors 214A, 214B, 214C, and 214D, respectively.

The bearing forces imposed on the bearing elements 210 in the first, second, third, and fourth recirculation track 216A, 216B, 216C, and 216D, respectively, are unbalanced. The bearing forces imposed on the bearing elements 210 in the first recirculation track 216A sum to a first net bearing force 238A. Similarly, the bearing forces imposed on the bearing elements 210 in the second recirculation track 216B sum to a second net bearing force 238B, the bearing forces imposed on the bearing elements 210 in the third recirculation track 214C sum to a third net bearing force 238C, and the bearing forces imposed on the bearing elements 210 in the fourth recirculation track 216D sum to a fourth net bearing force 238D. The first net bearing force 238A is directed radially away from the first ball nut deflector 214A. Similarly, the second net bearing force 238B is directed radially away from the second ball nut deflector 214B, the third net bearing force 238C is directed radially away from the third ball nut deflector 214C, and the fourth net bearing force 238D is directed radially away from the fourth ball nut deflector 214D. This is because there are no bearing forces imposed on the bearing elements 210 in the first, second, third, and fourth ball nut deflectors 214A, 214B, 214C, and 214D, respectively.

The first, second, third, and fourth net bearing forces 238A, 238B, 238C, and 238D, respectively, produce bending moments on the ball nut assembly 200. Specifically, the first and second net bearing forces 238A and 238B, respectively, produce a first bending moment 240 and the third and fourth net bearing forces 238C and 238D, respectively, produce a second bending moment 242. Alternatively, the first and third net bearing forces 238A and 238C, respectively, may produce the first bending moment 240 and the second and fourth net bearing forces 238B and 238D, respectively, may produce the second bending moment 242.

As the first and second angles 224 and 226, respectively, increase, the first and second bending moments 240 and 242, respectively, become increasingly unbalanced with each other. This is because, as the first and second angles 224 and 226, respectively, increase, the first and second bending moments 240 and 242, respectively, move away from both being in the first plane 218. As a result, the first and second bending moments 240 and 242, respectively, offset each other less. Conversely, as the first and second angles 224 and 226, respectively, decrease, the first and second bending moments 240 and 242, respectively, become more balanced with each other. This is because, as the first and second angles 224 and 226, respectively, decrease, the first and second bending moments 240 and 242, respectively, move towards both being in the first plane 218. As a result, the first and second bending moments 240 and 242, respectively, offset each other more.

Figure 9:
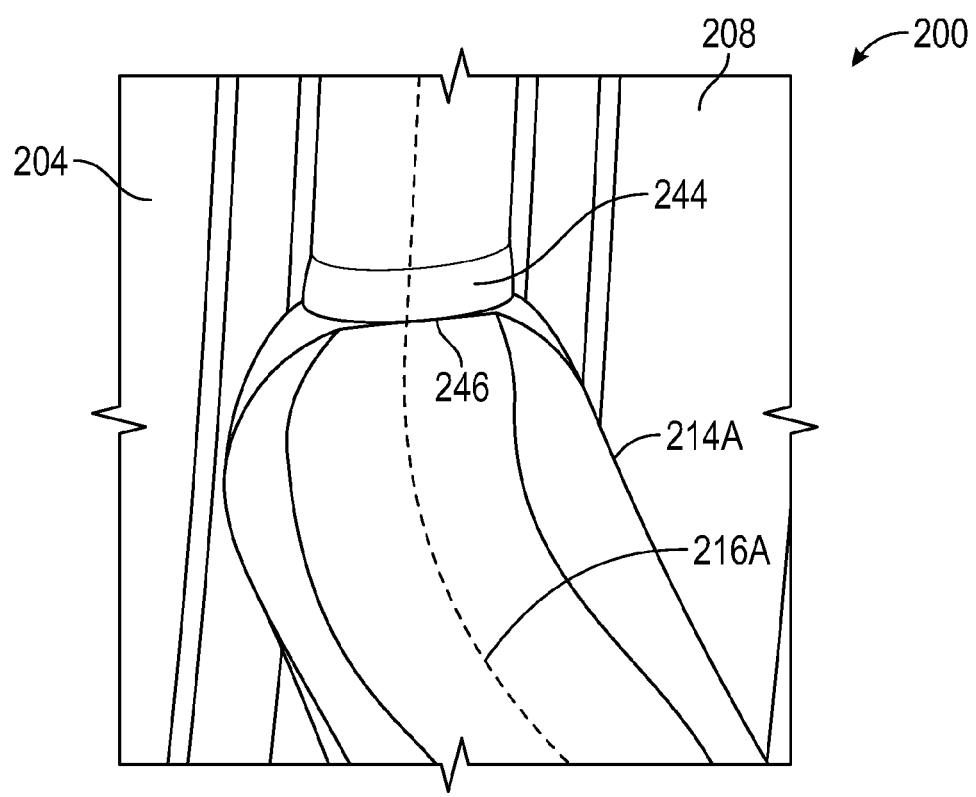
FIG. 9 is a perspective view of a ball nut deflector for the ball nut assembly of FIG. 7.

Referring now to FIG. 9, there is illustrated a portion of the first ball nut deflector 214A in detail. The second, third, and fourth ball nut deflectors 214B, 214C, and 214D, respectively, are similar to the first ball nut deflector 214A shown in FIG. 9. A ramp portion 244 is between the first recirculation track 216A on the outer threads 208 and the first ball nut deflector 214A. The ramp portion 244 results in a smoothed transition 246 between the outer threads 208 and the first ball nut deflector 214A. The bearing elements 210 travelling in the first recirculation track 216A travel over or otherwise contact the ramp portion 244 when entering or exiting between the first recirculation track 216A and the first ball nut deflector 214A. The ramp portion 244 allows the bearing elements 210 to be supported by the ramp portion 244 when entering the respective ball nut deflector 214. As such, sudden forces created by the bearing element 210 entering and exiting the recirculation track 216 can be reduced, resulting in less noise and wear between the ball nut 204 and bearing elements 210. It is further within the scope of the invention that the first 214A, second 214B, third 214C, and fourth 214D ball nut deflectors may have varying ball nut deflector designs, for example, incorporating a mix of the ball nut deflector designs shown in FIG. 4 and FIG. 9.

While described for use in a vehicle brake system, the ball nut assembly could be used in other applications, including other vehicle applications, such as steering systems. For example, it is especially suited for applications requiring reduced operating noise and a compact length.

In accordance with the provisions of the patent statutes, the principle and mode of operation of this invention have been described and illustrated in its preferred embodiment. However, it must be understood that this invention may be practiced otherwise than as specifically explained and illustrated without departing from its spirit or scope.

What is claimed is:

1. A ball nut assembly comprising:
a spindle having a longitudinal axis;
a ball nut;
bearing elements supporting the ball nut on the spindle;
first, second, third, and fourth ball nut deflectors between the ball nut and the spindle;
separate first, second, and third planes extending along and intersecting one another at the axis, wherein the first and fourth ball nut deflectors are in the first plane, the second ball nut deflector is in the second plane, the third ball nut deflector is in the third plane, and the second and third ball nut deflectors are on opposite sides of the first plane;
a first acute angle defined by the first and second planes; and
a second acute angle defined by the first and third planes, the second ball nut deflector being offset from the first plane by the first acute angle and the third ball nut deflector being offset from the first plane by the second acute angle such that the second and third ball nut deflectors overlap one another in a circumferential direction.

2. The ball nut assembly of claim 1 wherein the first and second acute angles are equal.

3. The ball nut assembly of claim 1 further comprising:
a first recirculation track corresponding to the first ball nut deflector;
a second recirculation track corresponding to the second ball nut deflector;
a third recirculation track corresponding to the third ball nut deflector; and
a fourth recirculation track corresponding to the fourth ball nut deflector, wherein the second and third recirculation tracks are mutually adjoining.

4. The ball nut assembly of claim 3 wherein the first and third recirculation tracks are not mutually adjoining.

5. The ball nut assembly of claim 1 wherein the second and third ball nut deflectors are both between the first and fourth ball nut deflectors along the axis.

6. The ball nut assembly of claim 5 further comprising:
a first distance between furthest extents of the first and third ball nut deflectors;
a second distance between furthest extents of the second and fourth ball nut deflectors; and
a third distance between the furthest extents of the first and fourth ball nut deflectors, wherein the second ball nut deflector is between the first and third ball nut deflectors, the third ball nut deflector is between the second and fourth ball nut deflectors, the first, second, and third distances are parallel to the axis, and a sum of the first and second distances is greater than the third distance.

7. The ball nut assembly of claim 1 further comprising:
a first recirculation track corresponding to the first ball nut deflector;
a second recirculation track corresponding to the second ball nut deflector;
a third recirculation track corresponding to the third ball nut deflector; and
a fourth recirculation track corresponding to the fourth ball nut deflector, wherein the second and third recirculation tracks overlap along the axis for an overlap distance.

8. The ball nut assembly of claim 1 further comprising:
at least one ramp portion between at least one of the first, second, third, and fourth ball nut deflectors and an outer thread of the ball nut.

9. The ball nut assembly of claim 1 wherein the ball nut assembly is adapted for use in a vehicle brake system.

10. A ball nut assembly comprising:
a first ball nut deflector for a first recirculation track;
a second ball nut deflector for a second recirculation track;
a third ball nut deflector for a third recirculation track;
a fourth ball nut deflector for a fourth recirculation track;
a longitudinal axis;

a first plane extending along the axis and in which the first and fourth ball nut deflectors are located;

a second plane extending along the axis and in which the second ball nut deflector is located;

a third plane extending along the axis and in which the third ball nut deflector is located, the first, second, and third planes being separate from one another and intersecting one another at the axis;

a first acute angle defined by the first and second planes; and a second acute angle defined by the first and third planes, the second ball nut deflector being offset from the first plane by the first acute angle and the third ball nut deflector being offset from the first plane by the second acute angle such that the second and third ball nut deflectors overlap one another in a circumferential direction.

11. The ball nut assembly of claim 10 wherein the first and second acute angles are equal.

12. The ball nut assembly of claim 10 wherein the second and third recirculation tracks are mutually adjoining.

13. The ball nut assembly of claim 10 wherein:
the first and second recirculation tracks are axially spaced and mutually adjoining;
the second and third recirculation tracks are axially spaced and mutually adjoining; and
the third and fourth recirculation tracks are axially spaced and mutually adjoining.

14. The ball nut assembly of claim 10 wherein the second and third recirculation tracks overlap parallel to the axis for an overlap distance.

15. The ball nut assembly of claim 10 further comprising:
a spindle extending along the axis;
a ball nut supported on the spindle by bearing elements, wherein the first, second, third, and fourth ball nut deflectors are supported between the spindle and the ball nut; and
at least one ramp portion between at least one of the first, second, third, and fourth ball nut deflectors and an outer thread of the ball nut.

16. A ball nut assembly comprising:
a spindle having a longitudinal axis;
a ball nut;
bearing elements supporting the ball nut on the spindle;

a first ball nut deflector for a first recirculation track between the spindle and ball nut;

a second ball nut deflector for a second recirculation track between the spindle and ball nut;

a third ball nut deflector for a third recirculation track between the spindle and ball nut;

a fourth ball nut deflector for a fourth recirculation track between the spindle and ball nut, wherein the second and third recirculation tracks are mutually adjoining, the first and third recirculation tracks are not mutually adjoining, and the second and third recirculation tracks overlap parallel to the axis for an overlap distance;

separate first, second, and third planes extending along and intersecting one another at the axis, wherein the first and fourth ball nut deflectors are in the first plane, the second ball nut deflector is in the second plane, the third ball nut deflector is in the third plane, and the second and third ball nut deflectors are on opposite sides of the first plane;

a first acute angle defined by the first and second planes; and a second acute angle defined by the first and third planes, the second ball nut deflector being offset from the first plane by the first acute angle and the third ball nut deflector being offset from the first plane by the second acute angle such that the second and third ball nut deflectors overlap one another in a circumferential direction.

17. The ball nut assembly of claim 16 wherein the first and second acute angles are equal.

18. The ball nut assembly of claim 16 further comprising:
a ramp portion and smoothed transition between each of the first, second, third, and fourth ball nut deflectors and an outer thread of the ball nut.

19. The ball nut assembly of claim 1 wherein portions of the second and third ball nut deflectors that overlap one another are longitudinally aligned with one another.

20. The ball nut assembly of claim 1 wherein the spindle has opposite first and second hemispheres, the first and fourth ball nut deflectors being on the first hemisphere, the second and third ball nut deflectors being on second hemisphere.

* * * * *